US009280325B2

(12) United States Patent  
Breedvelt-Schouten et al.

(10) Patent No.: US 9,280,325 B2
(45) Date of Patent: Mar. 8, 2016

(54) CUSTOMIZED READY-TO-GO COMPONENTIZED APPLICATION DEFINITIONS

(71) Applicant: International Business Machines Corporation, Armonk, NY (US)

(72) Inventors: Ilse M. Breedvelt-Schouten, Ottawa (CA); Jana H. Jenkins, Raleigh, NC (US); Jeffrey A. Kusnitz, Campbell, CA (US); James L. Lentz, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/291,830

(22) Filed: May 30, 2014

(65) Prior Publication Data

US 2015/0347095 A1 Dec. 3, 2015

(51) Int. Cl.
*G06F 9/44* (2006.01)
(52) U.S. Cl.
CPC .......................................... *G06F 8/34* (2013.01)
(58) Field of Classification Search
None
See application file for complete search history.

(56) References Cited

U.S. PATENT DOCUMENTS

| 8,352,875 B2 | 1/2013 | Peltz et al. | |
| 9,037,974 B2 * | 5/2015 | Waldman et al. | 715/731 |
| 2011/0041078 A1 | 2/2011 | Park et al. | |
| 2011/0209069 A1 | 8/2011 | Mohler | |
| 2011/0314042 A1 | 12/2011 | Nuggehalli et al. | |
| 2012/0072885 A1 | 3/2012 | Taragin et al. | |

FOREIGN PATENT DOCUMENTS

| JP | 05-136115 A | 12/1994 |
| JP | 11-035661 A | 8/2000 |
| JP | 11-348074 A | 6/2001 |
| JP | 17-092229 A | 10/2006 |
| JP | 23-005794 U | 1/2012 |

OTHER PUBLICATIONS

Author Unknown, Automatelt: Make your smartphone smarter!, Webpage/site, Printed from website on May 29, 2014, pp. 1-4, Automatelt, Published online at: http://automateitapp.com/.

(Continued)

*Primary Examiner* — Chuck Kendall
(74) *Attorney, Agent, or Firm* — Lee Law, PLLC; Christopher B. Lee

(57) ABSTRACT

A request to invoke a text-list definition of a componentized application is received. The text-list definition of the componentized application identifies a collection of different listed independent application sub-components specified by a user to be executed as a set. A componentized user interface is created with a different user interface component associated with each of the different listed independent application sub-components within the text-list definition of the componentized application. The different listed independent application sub-components are independently accessed based upon user inputs received in association with the respective different user interface component associated with each of the different listed independent application components within the text-list definition of the componentized application.

13 Claims, 7 Drawing Sheets

(56) References Cited

OTHER PUBLICATIONS

Author Unknown, User-Configured Situational Awareness Mashups, Webpage/site, Printed from website on May 29, 2014, pp. 1-4, Carnegie Mellon University, Published online at: http://www.sei.cmu.edu/mobilecomputing/research/mashups/.

Cristobal Viedma, Mobile Web Mashups: The Long Tail of Mobile Applications, Thesis, Dec. 2010, pp. 1-63, Published online at: http://www.mobilemashups.com/#tth_sEc6.4.2.

Kate Brennan, Mobile Mashups from Infinite Monkeys & Wufoo, Webpage/blog, Feb. 13, 2013, pp. 1-2, Wufoo, Survey Monkey, Inc., Published online at: http://www.wufoo.com/2013/02/13/mobile-mashups-from-infinite-monkeys-wufoo/.

Anant Athale, et al., One GUI: Method and System for User Interface Synthesis, IP.com Disclosure No. IPCOM000136583D, May 23, 2006, pp. 1-12, Motorola, Inc., Published online at: http://ip.com/IPCOM/000136583.

IBM, List of IBM Patents or Patent Applications Treated as Related, Applicant Appendix, Jun. 10, 2015, pp. 1-2.

PCT International Searching Authority, Japan Patent Office, International Search Report and Written Opinion for PCT Application No. PCT/IB2015/053268, Aug. 25, 2015, pp. 1-10, Tokyo, Japan.

\* cited by examiner

CUSTOMIZED READY-TO-GO COMPONENTIZED APPLICATION DEFINITIONS

BACKGROUND

The present invention relates to applications that may be executed by computing devices. More particularly, the present invention relates to customized ready-to-go componentized application definitions.

Computer-based applications allow users of a computing device to interact with the applications to perform activities. The activities may include, for example, work-related activities or entertainment-related activities, and the applications may provide a set of features that are determined and provided by the application developers that develop the respective applications. An example application with a set of features may include a word processing application offered to support work-related activities that includes printing, change tracking, view modification features, macros, and other functionality.

BRIEF SUMMARY

A method includes receiving, at a processor, a request to invoke a text-list definition of a componentized application, where the text-list definition of the componentized application identifies a collection of different listed independent application sub-components specified by a user to be executed as a set; creating a componentized user interface with a different user interface component associated with each of the different listed independent application sub-components within the text-list definition of the componentized application; and independently accessing the different listed independent application sub-components based upon user inputs received in association with the respective different user interface component associated with each of the different listed independent application components within the text-list definition of the componentized application.

A system includes a memory; and a processor programmed to: receive a request to invoke a text-list definition of a componentized application stored within the memory, where the text-list definition of the componentized application identifies a collection of different listed independent application sub-components specified by a user to be executed as a set; create a componentized user interface with a different user interface component associated with each of the different listed independent application sub-components within the text-list definition of the componentized application; and independently access the different listed independent application sub-components based upon user inputs received in association with the respective different user interface component associated with each of the different listed independent application components within the text-list definition of the componentized application.

A computer program product includes a computer readable storage medium having computer readable program code embodied therewith, where the computer readable program code when executed on a computer causes the computer to: receive a request to invoke a text-list definition of a componentized application, where the text-list definition of the componentized application identifies a collection of different listed independent application sub-components specified by a user to be executed as a set; create a componentized user interface with a different user interface component associated with each of the different listed independent application sub-components within the text-list definition of the componentized application; and independently access the different listed independent application sub-components based upon user inputs received in association with the respective different user interface component associated with each of the different listed independent application components within the text-list definition of the componentized application.

DETAILED DESCRIPTION

Figure 1:
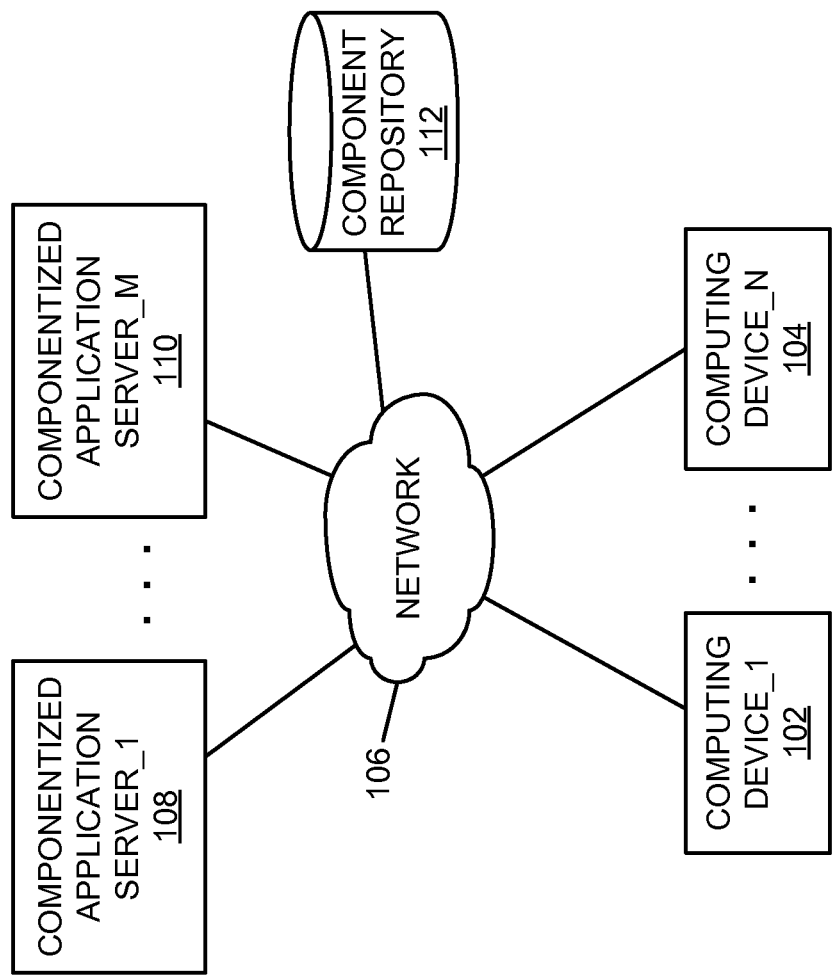
FIG. 1 is a block diagram of an example of an implementation of a system for customized ready-to-go componentized application definitions according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides customized ready-to-go componentized application definitions. Technology is provided that allows a user to define a user-specified/customized componentized application as a ready-to-go application definition. The "definition" of the ready-to-go componentized application is a listing/list of discrete independent stand-alone application sub-components/functions of the user's choosing. As such, the definition/listing of the ready-to-go componentized application is portable with low bandwidth and storage utilization. The ready-to-go componentized application may be started on a given platform of the user's choosing by invoking the definition/listing that itself specifies the user-selected independent stand-alone application sub-components, and retrieval of the respective user-selected independent stand-alone application sub-components. Each of the independent sub-components may be independently and selectively invoked and accessed as the user prefers to interact with the user-selected defined listing of sub-components/functions. Independent sub-components may further be sequenced to streamline user interaction with the user-selected defined listing of sub-components/functions.

The terms "ready-to-go componentized application" and "componentized application" are considered interchangeable within the description that follows, and the latter may be utilized for ease of reading in certain portions of the description. However, it is understood that the two phrases are synonymous with one another.

The definition of the componentized application may be invoked, for example, within a componentized application platform (alternatively termed "componentized" or "ready-to-go" application "framework"). The componentized application platform parses the definition/listing of sub-components, and retrieves the respective user-selected sub-components from local or remote storage. The componentized application platform creates user interfaces to each of the selected independent sub-components as an aggregated componentized user interface based upon available sub-component interface features of the different listed independent application sub-components. The componentized application platform passes user inputs to the respective sub-components to invoke the respective functions that are componentized within the respective sub-components.

Further, an order of listing of the sub-component identifiers within the text-list definition of the componentized application may be utilized as a priority or ranking measure of importance of the respective sub-components. The priority or ranking of importance of the respective sub-components may be utilized based upon form factor or other aspects of a particular device upon which the componentized application is invoked to select display locations for user interfaces to the respective sub-components. Additionally, users may specify sequences of sub-components such that interaction with one sub-component may trigger invocation of one or more additional sub-components.

As such, the present technology provides a resource-efficient "ecosystem" of application sub-components that may be prioritized and selectively invoked for interaction within a device-specific interface. The independent functions of the sub-components are specified by the list of sub-component references or sub-component identifiers that specify the selected sub-components and the functions performed by the respective sub-components. The list of sub-component references identify functions that may be considered to be parallel to one another from the perspective that the definition/listing represents a flat listing of references to sub-components/functions. Within this ecosystem, there are no hardcoded higher-level applications that incorporate all of the distinct features. Instead, the listing of sub-component/function references may be invoked/called and may be marshaled together at run time in a form/format (e.g., a form factor) appropriate for the respective device using a componentized application platform implemented on the device.

As described above, each of the independent sub-components may be independently and selectively invoked and accessed as the user prefers to interact with the user-selected defined listing of sub-components/functions. To further improve resource utilization, only sub-components that are actually interacted with by the user may be launched as active in-memory sub-components/functions. Additionally, for sequenced componentized applications, as described in more detail below, application sub-components may be removed from memory after completion of associated processing and invocation of other sub-components.

For purposes of the present description, the customized ready-to-go componentized application definitions may be considered a definition/listing of a componentized application of user-specified sub-components. The customized ready-to-go componentized application definitions provide runtime (on-demand) selective sub-component invocation of the listed sub-components as users interact with interface elements created to represent the respective sub-components. The componentized user-specified functional integration of features permits the user to define and perform task sets efficiently. As such, a user may create a customized ready-to-go componentized application within a single user interface without being distracted by extraneous features/functions that are not of interest to the user. The ready-to-go componentized application also allows the user to interact with specific functions of interest to the user without being required to switch to different applications, and without having to learn or navigate the different menuing structures of each of the different applications. It should be noted that the sub-components described here are considered independent and self-contained, and as such, are not required to communicate with each other, though customized sub-components may be implemented as appropriate for the given implementation.

Similarly, as introduced above, for purposes of the present description, the componentized application platform that supports the present technology may be referred to alternatively herein as a "componentized application framework" or as a "ready-to-go application framework." The ready-to-go application framework performs the higher-level integration of the different independent sub-components. As such, the ready-to-go application framework parses the definition/listing of sub-components, retrieves the respective user-selected sub-components from local or remote storage, and creates user interfaces to each of the selected independent sub-components as an aggregated componentized user interface. The "ready-to-go application framework" also passes user input to the respective sub-components to invoke the respective functions componentized within the respective sub-components.

Activation of the respective independent stand-alone application sub-components may be performed by downloading platform-specific versions of the sub-components from a componentized database of selectable independent stand-alone application sub-components. Alternatively, activation of the respective independent stand-alone application sub-components may be performed by invocation of the selected sub-components within the componentized database or on a server (e.g., a componentized application server).

As described above and in more detail below, the "ready-to-go" applications are composed in real time from componentized application definitions. The sub-components are extracted from a componentized database of application sub-components. The user may be provided with a menu of available sub-components/functions for assembly of the "ready-to-go" application.

As a preliminary example of the specification of selectable user selection of discrete independent stand-alone application sub-components/functions, a componentized database of selectable independent stand-alone application sub-components may provide a "ready-to-go" application definition interface. The "ready-to-go" application definition interface may provide a flat or menuing infrastructure by which users may browse and select functional components for the "ready-to-go" application definition (e.g., listing of selected functions).

The componentized database may compartmentalize selectable independent sub-components by category. For example, a communication category may include sub-components for sending or receiving individual emails, text messages, facsimiles, or other messages. A meeting category may include sub-components for storing and retrieving calendar entries, sub-components for storing and retrieving meeting and/or conference call details (e.g., a conference call number, passcode, attendee list), sub-components for dialing a telephone associated with a portable phone, sub-components for communications between attendees and moderators, sub-components for meeting information display, and/or sub-components for other meeting information and features. A planning category may include sub-components for viewing and editing work items (e.g., tasks or "to do" items and assignments), sub-components for viewing and editing project issues, sub-components for viewing and editing reports, sub-components for viewing and entering approvals, sub-components for viewing and editing product schedules, sub-components for entering questions, sub-components for feedback on completion of tasks by others, and/or sub-components for other project related tasks. A productivity category may include sub-components for setting schedule reminders, sub-components for note taking, sub-components for storing notes and information, sub-components for selecting fonts, sub-components for printing, and/or sub-components for other productivity related functions.

As such, the user may select desired functions from the different categories in an "a la carte" manner. The user may define a ready-to-go application by selection and specification of a list of individual selectable independent sub-components/functions. The definition of the ready-to-go application may be invoked to instantiate the ready-to-go application with only the features specified by the user. As such, a user-specific application interface experience may be created. In view of the definition including only a listing of sub-components of interest to the user, menuing and other navigation features may likely be omitted from the ready-to-go application because interface elements for each specified sub-component of the ready-to-go application may be provided within a single ready-to-go application user interface (i.e., within a window/page).

Further regarding invocation of the definition/listing to create an instance of the ready-to-go application, each sub-component/function may be assigned to a user interface element (e.g., a button or icon) that is placed on the user interface so that the user may access each sub-component individually. Alternatively, the user may further specify a sequence of component invocations within the definition/listing.

Such a sequence of component invocations may cause the invocation of the respective defined listing of sub-components/functions to follow a linear sequence in a wizard-like format. In a sequenced invocation of sub-components, completion of work in one sub-component may trigger the next sub-component in the definition/list to be activated or brought into focus for user interaction (e.g., user input and/or output to the user).

Further, features of sub-components may be combined within a user interface of the ready-to-go application when the ready-to-go application is instantiated from the definition. For example, a telephone dialer sub-component and a conference call details sub-component (e.g., with a conference call number, passcode, etc.) may both be specified in the definition of the ready-to-go application. Where a user enters and stores information for a particular conference call within the conference call details sub-component, the present technology may recognize associations between the two sub-components and create a "Join Meeting" button within the user interface of the ready-to-go application. The "Join Meeting" button, when selected by the user, causes the telephone dialer sub-component to use the telephone number stored in the conference call details sub-component to dial in for the conference call, and to enter the passcode for the conference call, all with a single user selection of the "Join Meeting" button. Other sub-components defined for the ready-to-go application may also be presented to the user in the single ready-to-go application user interface. As such, dynamic (real-time) integrated features may be created based upon the particular listing of components defined for the ready-to-go application, and the information entered by the user.

Further regarding sequencing of sub-components in a ready-to-go application, a user may nest ready-to-go application definitions within one another to allow one ready-to-go application to invoke additional ready-to-go applications. For example, within the context of the example above of the "Join Meeting" button, the user may specify a sequence of sub-components beginning with only a calendar entry sub-component within which content is provisioned that includes another definition/list such as the telephone dialer sub-component and the conference call details sub-component. The user may invoke the definition of the calendar entry sub-component to instantiate the calendar entry ready-to-go application. The calendar entry ready-to-go application executes the calendar entry sub-component, which itself includes provisioning (content) that includes the definition(s) of the other sub-component(s) that has/have not yet been invoked. The user may specify a date and time to associate a trigger event with the calendar entry sub-component. At the specified time, the calendar entry sub-component invokes the provisioned content definition of other sub-components, which causes instantiation of another nested sub-component definition of a new ready-to-go application (or an additional portion of the current ready-to-go application) for the meeting at the scheduled time. As noted in the example above, the user may be presented with a "Join Meeting" button in the new ready-to-go application to join the meeting, along with separate user interface features for any other specified components. The calendar entry ready-to-go application may be configured to terminate after invocation of the provisioned content definition, or may continue to execute as configured by user selections available within the componentized calendar entry sub-component.

As such, ready-to-go application definitions may be sequenced and/or nested to trigger creation of other/new ready-to-go applications or other portions of a ready-to-go application. Many other options for definition and creation of ready-to-go applications based upon the description herein are possible, and all such options are considered within the scope of the present subject matter.

The ready-to-go applications may further be pre-configured with multiple forms of context/information, such as for different types of meetings (e.g., internal productivity/project meetings, client meetings, public presentations, etc.). Within this form of context-based implementation, the ready-to-go application may be configured with an initial context sub-component in a sequence of sub-components that prompts the user for entry of context for the ready-to-go application. The context sub-component may receive information from the user, such as that the meeting is a client meeting, and may retrieve other context/information usable by other sub-components in the sequence. The other sub-components may be presented to the user within a unified window/page populated with information for the specific client (e.g., client names and titles, questions asked by client and determined answers, etc.).

Another feature of the ready-to-go application may include a user-selectable interactive record feature that allows a user to selectively capture and archive interactions performed using the ready-to-go application. For example, where a user has pre-configured certain forms (e.g., context) and utilizes the ready-to-go application to perform a sequence of actions (e.g., selection of a "Join Meeting" button, and invoking a note-taking sub-component), the user may invoke an "archive interactions" feature of the ready-to-go application framework to archive user interactions with the individual discrete and separate sub-components that make up the ready-to-go application. These archived user interactions with the individual discrete and separate sub-components that make up the ready-to-go application may be automatically repeated the next time the user invokes the definition of the ready-to-go application to initiate automated execution by the ready-to-go application framework of the independent sub-components. As such, within the present example, the "Join Meeting" button may be automatically selected (which as described above invokes features of multiple sub-components) to join the meeting, and the note-taking sub-component may be invoked to prepare the ready-to-go application for user input. Accordingly, the user may use the ready-to-go application framework to not only selectively define sub-components within a list of independent componentized sub-components for invocation of user-selected functionality, but the user may also use the ready-to-go application framework to automate user interactions with user-defined ready-to-go applications.

It should further be noted that granularity of sub-components may be created as appropriate for a given implementation. As such, user selection of features is not limited to larger components. Instead, sub-components may be configured on a feature-by-feature basis so that users may selectively define individual features. In view of the many features and granularity of the ready-to-go applications and the ready-to-go application framework, user efficiency may be increasingly improved as users further refine and customize recorded input operations. Many other possibilities for use of the present technology exist, and all such possibilities are considered within the scope of the present technology.

It should additionally be noted that, in view of the compact definitional/listing format of the ready-to-go applications, these definitions may be shared among friends and/or colleagues without consuming excessive transportation bandwidth or storage space. Other users may modify the definitions as appropriate for their uses.

As described above and in more detail below, the user may port the lightweight listing to any device the user intends to use during a particular time period. For example, where a user may be attending a business meeting while traveling through an airport, the user may utilize a tablet or portable phone to invoke the definition/listing of the ready-to-go application on that device. Alternatively, if the user is in an office space with access to a laptop or desktop computer, the user may utilize the respective computer to invoke the definition/listing of the ready-to-go application on that device. Many other platforms for invocation of a definition/listing of a ready-to-go application are possible, and all such invocations are considered within the scope of the present subject matter.

It should be noted that conception of the present subject matter resulted from recognition of certain limitations associated with previous application technologies. For example, it was observed that users of applications have to startup many separate applications and navigate the separate applications to perform different activities provided by and as determined by the developers of the different applications. However, it was also observed that users of many different applications often use specific subsets of features provided by the different applications, and that use of these subsets of features often results in repeating patterns of feature usage. For example, it was observed that an example in business may be that a user has a weekly conference call with a project team and always uses a calendar application to find the conference call number, opens a separate planning application that is changing every week to view status of the project, and takes private notes of tasks to perform in another completely separate application. It was additionally observed that the operating systems (OS) of various user computing devices typically use a set of icons that each invoke one of the different applications, and that each application further has its own graphical user interface (GUI) with each GUI having a different hierarchical menu structure with sub-functionalities that have to be found by navigation of the different hierarchical menus within the different application GUIs. It was further observed that users have to continually switch between applications and navigate the different hierarchical menus from the different application interfaces to find and invoke the desired features. In view of these observations, it was determined that many users perform many repeating steps using many different applications (e.g., cross-application feature usage), and that efficiency is lost by the user having to navigate between so many different applications and different hierarchical menu structures to perform the desired repeating patterns of cross-application feature usage. It was further determined that as users increasingly use smaller form-factor devices (e.g., handheld smartphones, etc.) to perform these types of repeating patterns of cross-application feature usage, it becomes more difficult to navigate the different application interfaces to find and invoke the desired features, which results in further reductions in user efficiency and productivity.

In view of these several observations and determinations, it was additionally determined that a user-customizable application that allows users to form user-specific selections of many different types of features from a single user interface was needed. It was further determined that it was desirable for users to have access to the customized application interfaces on different platforms without requiring users to port full applications from platform to platform. It was determined that specification of user-defined componentized applications using user-defined componentized application "definitions" that identify a specific listing/list of different components that are to be formed into the single user interface would provide a lightweight portable representation of user-defined applications that may be instantiated by selection of platform-specific components for different platforms/devices at runtime. It was further determined that a componentized database of selectable and independent stand-alone application sub-components would allow users to customize many different user interfaces for many different user-specified purposes. Additionally, the lightweight user-defined componentized application definitions/listings may be parsed in real time as the componentized application definitions are invoked either to download the platform-specific application sub-components to form a user-specified "ready-to-go" application, or to execute and invoke the respective application sub-components within the remote platform as the user-specified "ready-to-go" application. The ready-to-go (componentized) application framework described herein manages invocation of the different independent sub-components, and passes user inputs to the respective sub-components for processing. As such, the present subject matter improves user-specific application definition and portability by providing customized ready-to-go componentized application definitions, as described above and in more detail below.

The customized ready-to-go componentized application definitions described herein may be performed in real time to allow prompt and lightweight definition of applications, ease of application portability, and instantiation of user-customized applications as componentized application definitions are invoked. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for customized ready-to-go componentized application definitions. A computing device_1 102 through a computing device_N 104 communicate via a network 106 with several other devices. The other devices include a componentized application server_1 108 through a componentized application server_M 110.

A component repository 112 provides storage for independent sub-components that may be selected and combined into a definition/listing that specifies a componentized application. The definition/listing may be ported among the various devices of the system 100 as appropriate for use and invocation of a componentized application from the definition/listing. As such, the component repository 112 identifies published individual sub-components that are available for any user to create a listing/definition of a componentized application.

It should be noted that independent sub-components useable for a componentized application may additionally/alternatively be stored locally on any of the devices shown within the system 100. As such, the definition may be specified as a listing, and at invocation of the definition/listing, the componentized application framework may identify the respective sub-components at any location within the system 100, and may invoke the respective sub-components at their respective storage locations or may download platform-specific implementations of the sub-components to any of the devices from which the componentized application is to be executed. As such, many alternatives for storage and execution of the independent sub-components are possible, and all such alternatives are considered within the scope of the present technology. Further, by the nature of the lightweight definition/listing of a componentized application listing identifiers of different sub-components rather than encapsulating the actual sub-components themselves, the definition/listing of a componentized application may be ported/stored using minimal bandwidth and storage space, respectively.

As will be described in more detail below in association with FIG. 2 through FIG. 5C, any of the computing device_1 102 through the computing device_N 104 and the componentized application server_1 108 through the componentized application server_M 110 may implement a componentized application framework and may provide automated customized ready-to-go componentized application definitions. The automated customized ready-to-go componentized application definitions is based upon use of the componentized application framework to define and invoke/control independent sub-components to formulate a completely user-specified componentized application. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The component repository 112 may include a relational database, an object database, or any other storage type of device. As such, the component repository 112 may be implemented as appropriate for a given implementation.

Figure 2:
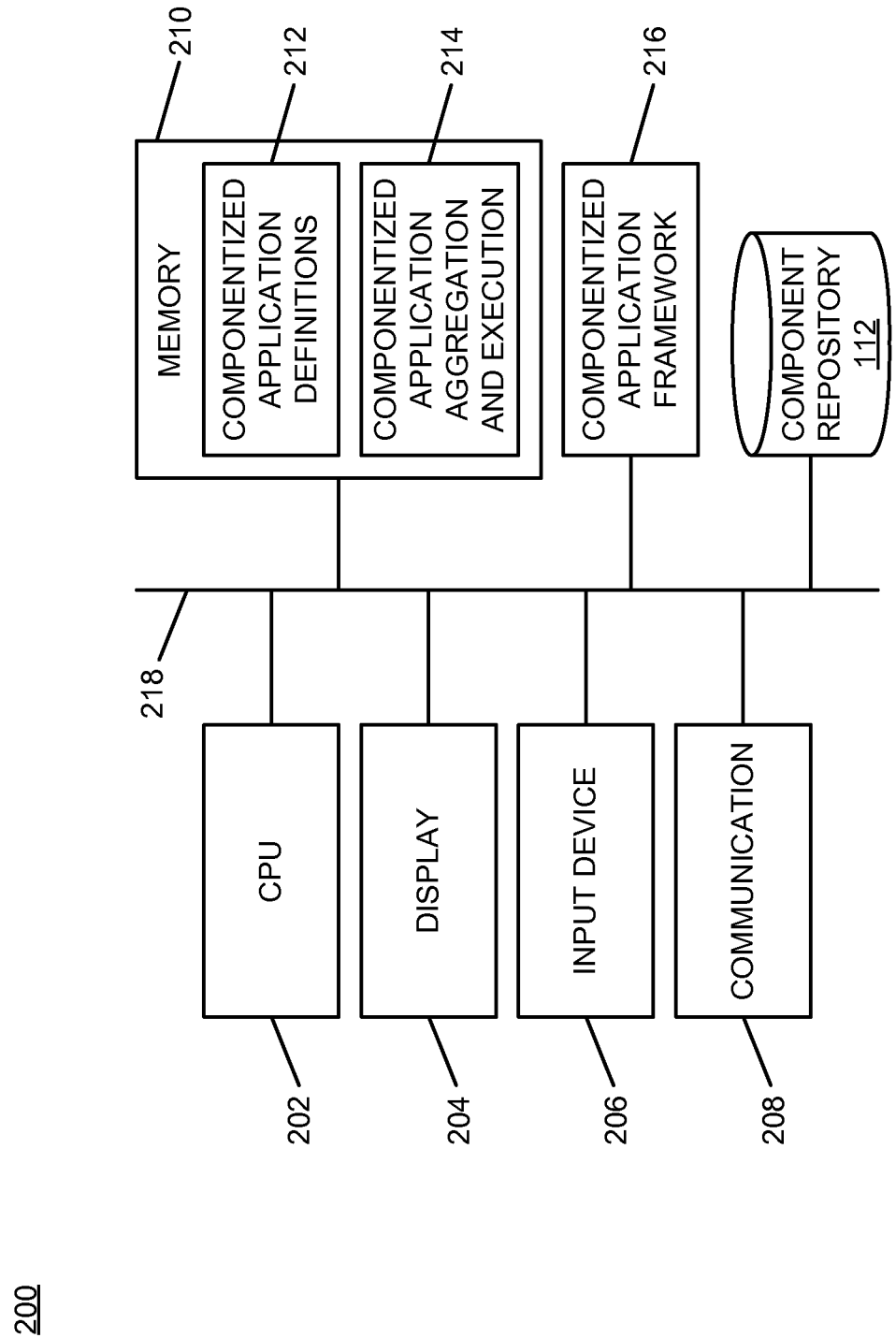
FIG. 2 is a block diagram of an example of an implementation of a core processing module capable of providing customized ready-to-go componentized application definitions according to an embodiment of the present subject matter.

FIG. 2 is a block diagram of an example of an implementation of a core processing module 200 capable of providing customized ready-to-go componentized application definitions. The core processing module 200 may be associated with either the computing device_1 102 through the computing device_N 104 or with the componentized application server_1 108 through the componentized application server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of componentized applications in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a componentized application definitions storage area 212 that stores definitions/listings of componentized applications within the core processing module 200. The memory 210 also includes a componentized application aggregation and execution area 214 that provides storage and execution space for individual sub-components that are correlated/aggregated into a componentized application.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A componentized application framework module 216 is also illustrated. The componentized application framework module 216 provides capabilities for a user to define and invoke definitions of componentized applications in association with the core processing module 200, as described above and in more detail below. The componentized application framework module 216 provides an interface for the user to view available sub-components that are published and available for use to define listings of componentized applications, and controls invocation of componentized application definitions and execution of componentized applications. As such, the componentized application framework module 216 implements the automated customized ready-to-go componentized application definitions of the core processing module 200.

It should also be noted that the componentized application framework module 216 may form a portion of other circuitry described without departure from the scope of the present subject matter. Further, the componentized application framework module 216 may alternatively be implemented as an application stored within the memory 210. In such an implementation, the componentized application framework module 216 may include instructions executed by the CPU 202 for performing the functionality described herein. The CPU 202 may execute these instructions to provide the processing capabilities described above and in more detail below for the core processing module 200. The componentized application framework module 216 may form a portion of an interrupt service routine (ISR), a portion of an operating system, a portion of a browser application, or a portion of a separate application without departure from the scope of the present subject matter.

The component repository 112 is again shown within FIG. 2 associated with the core processing module 200. As such, the component repository 112 may be operatively coupled to the core processing module 200 without use of network connectivity, as appropriate for a given implementation.

The CPU 202, the display 204, the input device 206, the communication module 208, the memory 210, the componentized application framework module 216, and the component repository 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the component repository 112 is illustrated as a separate component for purposes of example, the information stored within the component repository 112 may also/alternatively be stored within the memory 210 without departure from the scope of the present subject matter. Accordingly, the core processing module 200 may take many forms and may be associated with many platforms.

FIG. 3 through FIG. 5C described below represent example processes that may be executed by devices, such as the core processing module 200, to perform the automated customized ready-to-go componentized application definitions associated with the present subject matter. Many other variations on the example processes are possible and all are considered within the scope of the present subject matter. The example processes may be performed by modules, such as the componentized application framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 3:
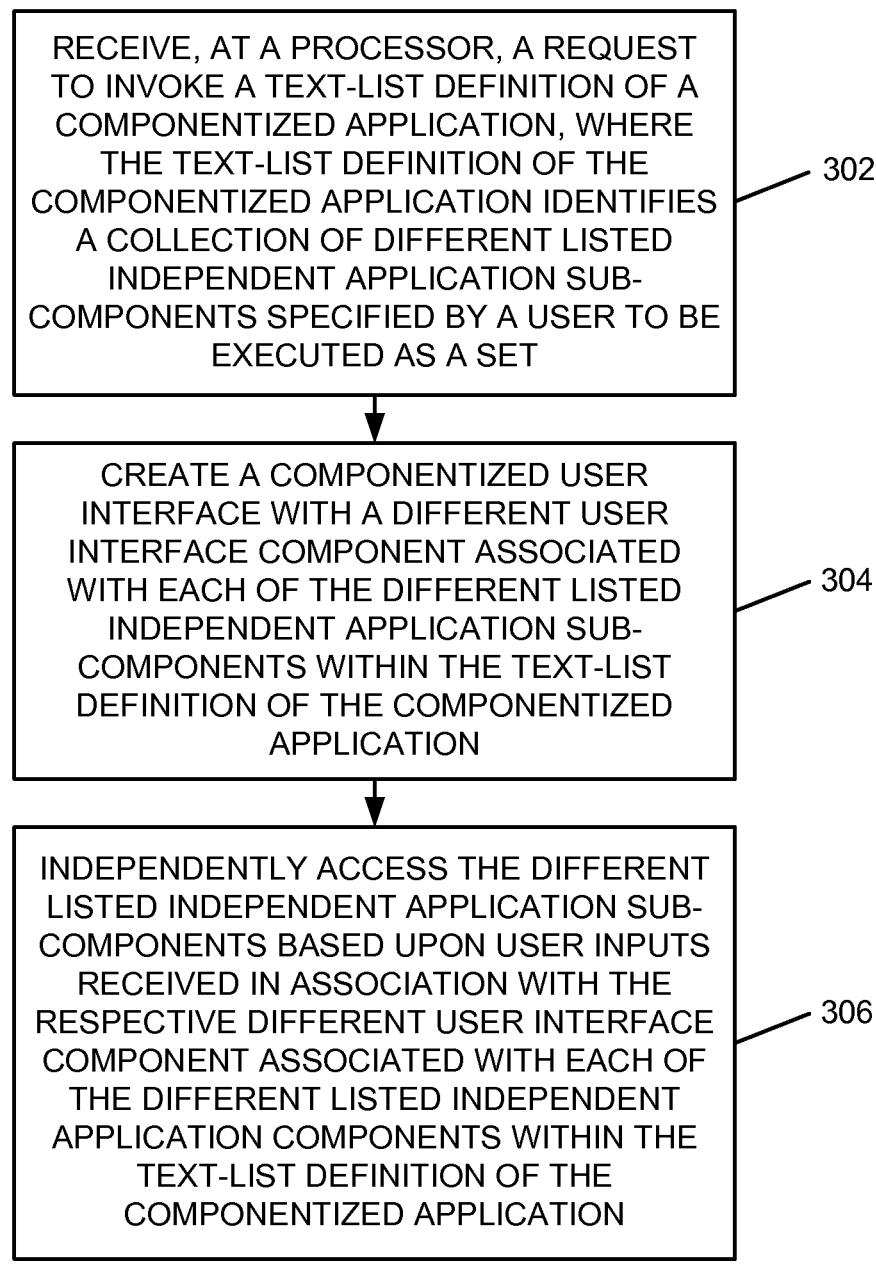
FIG. 3 is a flow chart of an example of an implementation of a process for customized ready-to-go componentized application definitions according to an embodiment of the present subject matter.

FIG. 3 is a flow chart of an example of an implementation of a process 300 for customized ready-to-go componentized application definitions. At block 302, the process 300 receives, at a processor, a request to invoke a text-list definition of a componentized application, where the text-list definition of the componentized application identifies a collection of different listed independent application sub-components specified by a user to be executed as a set. At block 304, the process 300 creates a componentized user interface with a different user interface component associated with each of the different listed independent application sub-components within the text-list definition of the componentized application. At block 306, the process 300 independently accesses the different listed independent application sub-components based upon user inputs received in association with the respective different user interface component associated with each of the different listed independent application components within the text-list definition of the componentized application.

Figure 4:
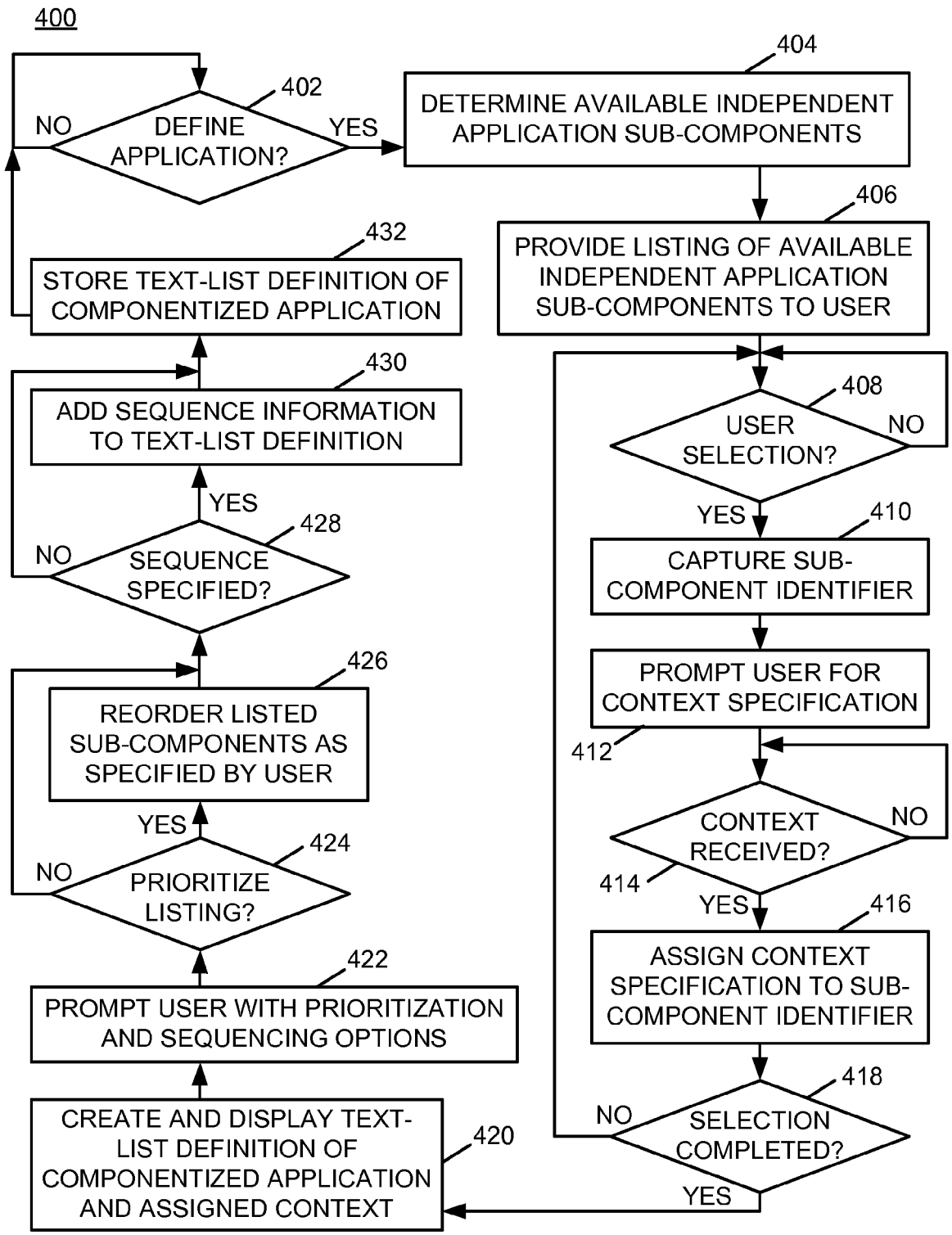
FIG. 4 is a flow chart of an example of an implementation of a process for creation of customized ready-to-go componentized application definitions according to an embodiment of the present subject matter.

FIG. 4 is a flow chart of an example of an implementation of a process 400 for creation of customized ready-to-go componentized application definitions. At decision point 402, the process 400 makes a determination as to whether a request to define a new componentized application has been detected. In response to determining to that a request to define a new componentized application has been detected, the process 400 determines available independent application sub-components that may be selected at block 404. The determination of available independent application sub-components that may be selected may be made by locating available sub-component identifiers within a sub-component storage location, such as within the component repository 112, or within another local or remote storage location.

At block 406, the process 400 provides a listing of available independent application sub-components to the requesting user. The listing of available independent application sub-components provided to the user may include sub-component identifiers and related descriptions of the functionality provided by each sub-component. As described above, the available independent application sub-components may each provide distinct application features that are independently executable, and these distinct application features may be selected by the user in an "a la carte" manner to define a componentized application.

At decision point 408, the process 400 makes a determination as to whether a user selection of an available independent application sub-component has been received. In response to determining that a user selection of an available independent application sub-component has been received, the process 400 captures a sub-component identifier of the selected sub-component at block 410.

At block 412, the process 400 prompts the user for a context specification for the selected available independent application sub-component. As also described above, context for sub-components may be provided to pre-configure data that may be loaded and used by the sub-components when they are activated. The context specification may include a storage location, a filename, or other form of context location identification, as appropriate for a given implementation.

At decision point 414, the process 400 makes a determination as to whether a context specification has been received. In response to determining that the context specification has been received, the process 400 assigns the context specification to the sub-component identifier of the sub-component at block 416.

At decision point 418, the process 400 makes a determination as to whether user selection of sub-components is completed, such as by detection of a user selection of a user interface button such as "Define Componentized Application." In response to determining that user selection of sub-components is not completed, the process 400 returns to decision point 408 and iterates as described above to process additional sub-component selections. As such, the process 400 may receive a user selection of a sub-set of the listed available independent application sub-components.

In response to determining at decision point 418 that user selection of sub-components is completed, the process 400 creates and displays a text-list definition of the componentized application and the assigned context, each as specified by the user, at block 420. As such, the user may define the customized and componentized application to have only the features and sub-components of interest to the user, and may configure initial data/context for each component.

As described above, an order of listing of the sub-component identifiers within the text-list definition of the componentized application may be utilized as a priority or ranking measure of importance of the respective sub-components. The priority or ranking of importance of the respective sub-components may be utilized based upon form factor or other aspects of a particular device upon which the componentized application is invoked to select display locations for user interfaces to the respective sub-components. Additionally, users may specify sequences of sub-components such that interaction with one sub-component may trigger invocation of one or more additional sub-components.

As such, the process 400 prompts the user with prioritization and sequencing options to allow the user to prioritize and sequence the text-list definition of the componentized application at block 422. At decision point 424, the process 400 makes a determination as to whether the user has moved any sub-component identifiers in the displayed text-listing definition of the componentized application to prioritize the sub-components. In response determining that the user has moved one or more sub-component identifiers in the displayed text-listing definition of the componentized application, the process 400 reorders the listed sub-component identifiers in the text-listing definition of the componentized application as specified by the user at block 426.

In response to reordering the listed sub-component identifiers at block 426, or in response to determining at decision point 424 that the user has not moved any sub-component identifiers in the displayed text-listing definition, the process 400 makes a determination at decision point 428 as to whether the user has specified sequencing of any sub-component identifiers in the displayed text-listing definition of the componentized application. By use of sequencing of individual independent sub-components, use of one sub-component may become context for another sequenced sub-component to cause invocation of the following sub-component. Sequencing of the sub-component identifiers may be designated, for example, by sequentially numbering one or more sub-components, by use of arrows from one sub-component to one or more other sub-components, or otherwise as appropriate for a given implementation.

In response determining at decision point 428 that the user has specified a sequencing of sub-component identifiers in the displayed text-listing definition of the componentized application, the process 400 adds the sequencing information/specification to the text-listing definition of the componentized application as specified by the user at block 430. The sequencing information/specification may be specified within the text-listing definition using hierarchy, numeric sequence designation, or any other approach as appropriate for a given implementation.

In response to adding the sequencing information/specification to the text-listing definition at block 430, or in response to determining at decision point 428 that the user has not specified a sequencing of sub-component identifiers, the process 400 stores the text-list definition of the componentized application at block 432. The process 400 returns to decision point 402 and iterates as described above.

As such, the process 400 determines and provides a listing of available independent application sub-components that may be selected by a user and creates a customized text-list definition of a componentized application in response to user selection of individual independent functional sub-components. The process 400 allows the user to prioritize and sequence sub-components, and stores the text-list definition of the componentized application. As described above, and in more detail below, the text-list definition of the componentized application is portable and may itself be invoked on a variety of computing platforms by selective download of the specified sub-components as they are interacted with by the user.

Figure 5A:
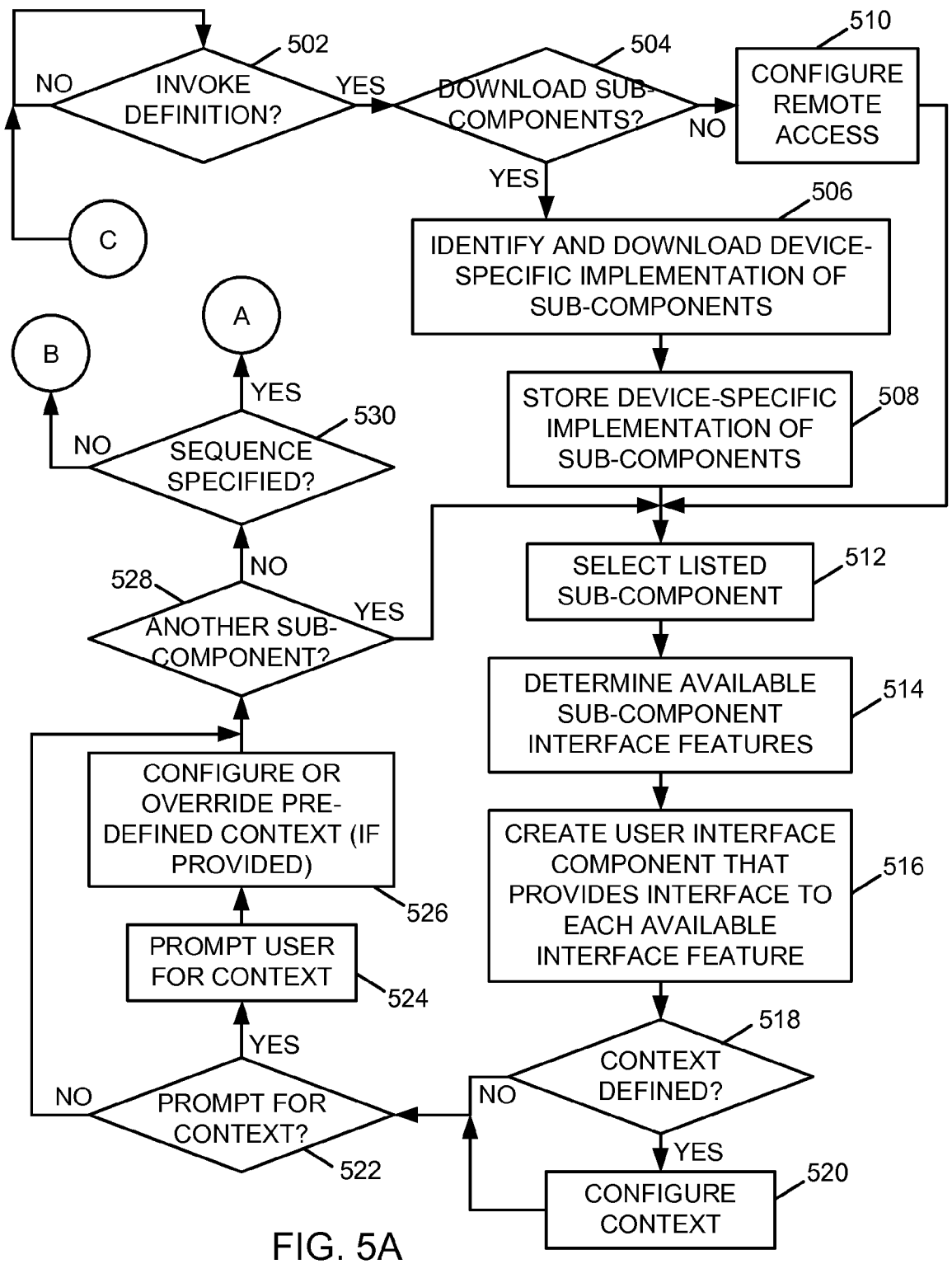
FIG. 5A is a flow chart of an example of an implementation of initial processing within a process for runtime selective sub-component invocation of customized ready-to-go componentized application definitions according to an embodiment of the present subject matter.
Figure 5B:
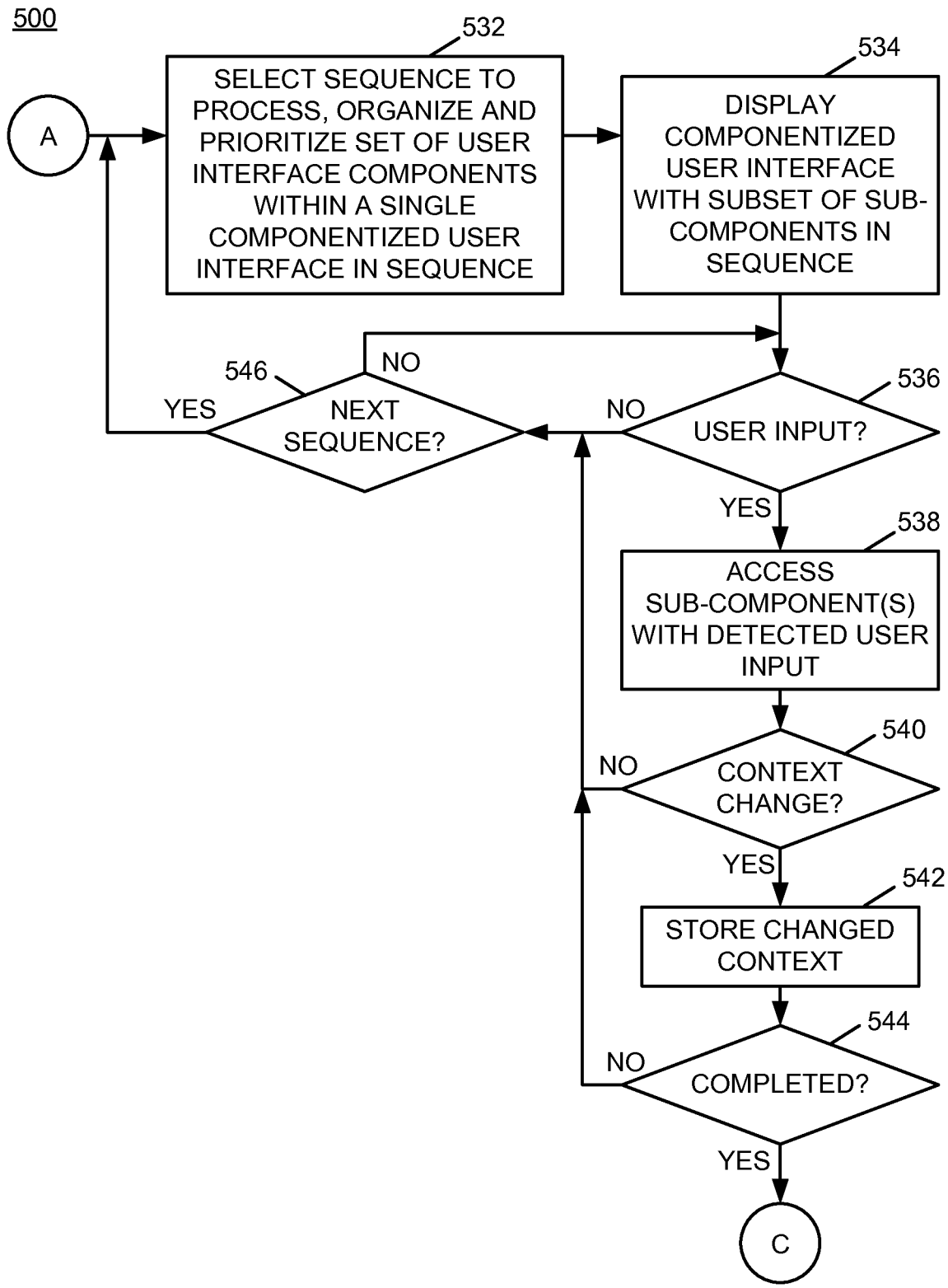
FIG. 5B is a flow chart of an example of an implementation of first additional processing within a process for runtime sequencing and selective sub-component invocation of customized ready-to-go componentized application definitions including processing for sequencing sub-component invocations according to an embodiment of the present subject matter.
Figure 5C:
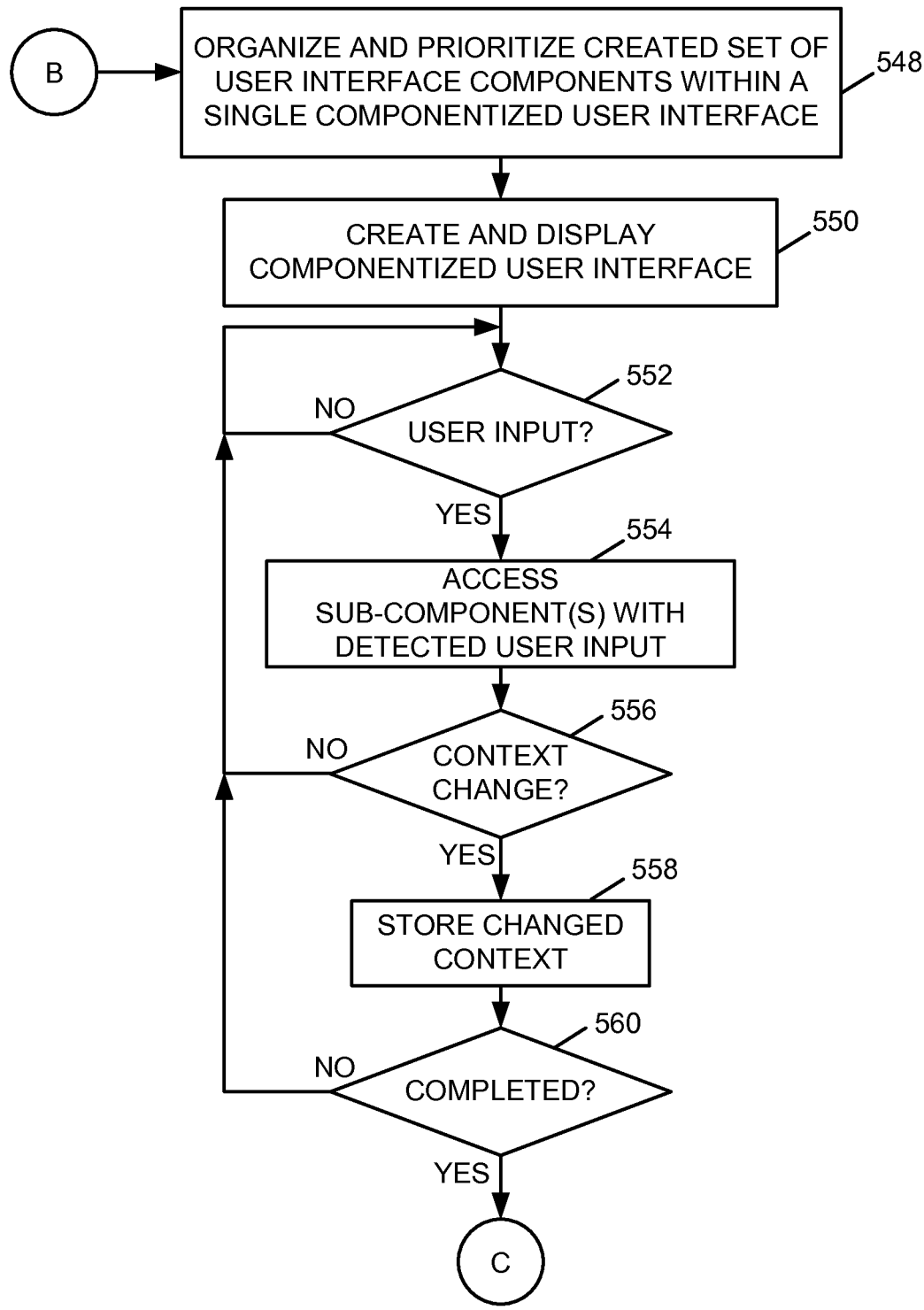
FIG. 5C is a flow chart of an example of an implementation of second additional processing within a process for runtime selective sub-component invocation of customized ready-to-go componentized application definitions according to an embodiment of the present subject matter.

FIGS. 5A-5C illustrate a flow chart of an example of an implementation of process 500 for runtime selective sub-component invocation of customized ready-to-go componentized application definitions. FIG. 5A illustrates initial processing within the process 500. At decision point 502, the process 500 makes a determination as to whether a request to invoke a text-list definition of a componentized application has been detected/received. As described above, the text-list definition of the componentized application identifies a collection of different independent application sub-components specified by a user to be executed as a set.

In response to determining at decision point 502 that a request to invoke a text-list definition of a componentized application has been detected/received, the process 500 makes a determination as to whether to download the specified sub-components at block 504. As described above, device-specific sub-components may be downloaded for local invocation, or the sub-components may be invoked on a server platform as they are interacted with by the user. As such, the process 500 may choose between downloading the different independent application sub-components for local execution and executing remote versions of the different independent application sub-components.

In response to determining at decision point 504 to download the specified sub-components, the process 500 identifies the specified sub-components within the text-list definition of the componentized application and downloads a device-specific implementation of each of the different listed independent application sub-components specified in the text-list definition of the componentized application at block 506. The download of the sub-components may be from a remote storage location, such as the component repository 112. The process 500 stores the downloaded device-specific implementation of each of the different listed independent application sub-components within local storage at block 508. As such, with local storage of sub-components, the process 500 provides independent access to the different listed independent application sub-components within the local storage.

Alternatively, in response to determining at decision point 504 not to download the specified sub-components, the process 500 configures remote access to the specified sub-components at block 510. Configuration of remote access to the specified sub-components may include identifying and accessing the respective sub-components within one or more remote storage locations within a distributed network, such as the component repository 112 or one or more of the componentized application server_1 108 through the componentized application server_M 110.

In response to downloading and storing the device-specific sub-components at blocks 506 and 508, or in response to configuring remote access to the respective sub-components at block 510, the process 500 selects a listed sub-component from the text-list definition of the componentized application at block 512. At block 514, the process 500 determines available sub-component interface features of the selected independent application sub-component. At block 516, the process 500 creates a user interface component that provides an interface to the available sub-component interface features of the selected independent application sub-component.

At decision point 518, the process 500 makes a determination as to whether context has been defined for the respective sub-component, such as initial configuration information associated with the text-list definition identifier of the sub-component (e.g., a file location or text information within the text-list definition). In response to determining that context has been defined for the respective sub-component, the process 500 configures the defined context for the sub-component at block 520, which may include downloading or opening a file, adding context definition information to data values of the sub-component, or other processing to configure the context for the sub-component.

In response to configuring the context for the sub-component at block 520, or in response to determining at decision point 518 that context has not been defined for the respective sub-component, the process 500 makes a determination as to whether to prompt the user for context for the respective sub-component at decision point 522. As such, where context may have not be specified for individual sub-components within the text-list definition, the user may be prompted to provide context for the sub-component during invocation (e.g., a client name or other information). Additionally, a user may override default/configured context for a sub-component.

As such, in response to determining at decision point 522 to prompt the user for context for the respective sub-component, the process 500 prompts the user for context for the respective sub-component or to override pre-defined context, at block 524. At block 526, the process 500 configures or overrides the pre-defined context (if any context is provided by the user responsive to the prompt). It is understood that the user may elect not to configure or override the pre-defined context, even when prompted with the option. As such, there may be no context provided for a sub-component or overridden at block 526.

In response to configuring or overriding the pre-defined context (if any context is provided by the user responsive to the prompt) at block 526, or in response to determining at decision point 522 not to prompt the user for context for the respective sub-component, the process 500 makes a determination at decision point 528 as to whether another sub-component is specified in the text-list definition of the componentized application. In response to determining that another sub-component is specified in the text-list definition of the componentized application, the process 500 returns to block 512 and selects the next sub-component. The process 500 iterates as described above. As such, the process 500 iteratively creates a set of user interface components that each provides an interface to each of the determined available sub-component interface features of one of the different listed independent application sub-components Returning to the description of decision point 528, in response to determining that another sub-component is not specified in the text-list definition of the componentized application (all sub-components processed), the process 500 makes a determination at decision point 530 as to whether a sequence has been specified for any of the sub-components within the text-list definition of the componentized application. For example, as described above an independent application sub-component may be specified to invoke another independent application sub-component or set of independent application sub-components. At this point of processing, additional processing for the respective affirmative or negative determinations is described with reference to a different drawing figure to reduce crowding within the drawings. Each of these respective drawing figures will be described in turn in detail below.

As such, in response to determining at decision point 530 that a sequence has been specified for any of the sub-components within the text-list definition of the componentized application, the process 500 transitions to the processing shown and described in association with FIG. 5B.

FIG. 5B illustrates a first portion of additional processing associated with the process 500 for runtime sequencing and selective sub-component invocation of customized ready-to-go componentized application definitions. The processing described within FIG. 5B represents processing for sequencing sub-component invocations responsive to a determination that the text-list definition of the componentized application includes an indication of a sequence of invocation of at least two of the different independent application sub-components within the text-list definition of the componentized application.

At block 532, the process 500 selects a specified sequence to process and further organizes and prioritizes the created set of user interface components associated with the sequence within a single componentized graphical interface display component. The prioritization may include prioritizing a graphical user interface layout location of the respective different user interface component associated with each of the different listed independent application sub-components in the current sequence of the text-list definition of the componentized application within the componentized user interface. As described above, the prioritization may be based upon a position of an identifier of each of the different listed independent application sub-components within the sequence of the text-list definition of the componentized application. At block 534, the process 500 displays the single componentized graphical interface display component comprising the organized created set of prioritized user interface components of the current sequence of sub-components.

At decision point 536, the process 500 makes a determination as to whether user input has been detected in association with one or more of the sub-components represented within the displayed componentized graphical interface for the current sub-component sequence. It should be noted that the process 500 may also detect a user selection of a user-selectable interactive record feature that allows a user to selectively capture and archive interactions performed using the ready-to-go application. These interactions may be captured as a context change associated with the respective sub-component, as described in more detail below.

In response to determining that user input has been detected in association with one or more of the sub-components, the process 500 accesses the respective sub-component(s) with the detected user input at block 538. As described above, the access to the respective sub-component(s) with the detected user input may be local or remote access to the respective sub-components.

At decision point 540, the process 500 makes a determination as to whether the user input resulted in a context change for any of the respective sub-component(s). For example, the user may enter notes or information in association with use of any of the sub-components of the componentized application. This entered information may become new or updated context for the componentized application, and the information may be archived for later use within the same or a different componentized application. Additionally, the user may have selected the user-selectable interactive record feature that allows a user to selectively capture and archive interactions performed using the ready-to-go application. These interactions may be captured as a context change associated with the respective sub-component.

In response to determining that the user input resulted in a context change for one or more of the respective sub-component, the process 500 stores the changed context at block 542. The process 500 makes a determination as to whether processing for the componentized application is completed at decision point 544. The determination at decision point 544 that processing for the componentized application is completed may result, for example, from completion of processing of the last sub-component or set of sub-components in a sequence of componentized interfaces.

In response to determining at decision point 544 that processing for the componentized application is not completed, or in response to determining at decision point 540 that the user input did not result in a context change for any of the respective sub-component(s), or in response to determining at decision point 536 that user input has not been detected in association with one or more of the sub-components, the process 500 makes a determination at decision point 546 as to whether to process a next sequence of sub-components. The determination at decision point 546 to process a next sequence of sub-components may result, for example, from completion of processing of all input appropriate for the current sequence of componentized interfaces.

In response to determining at decision point 546 that additional user interaction with the current sequence is detected (i.e., a determination not to process a next sequence of sub-components at this time), the process 500 returns to decision point 536 and iterates as described above to process additional user inputs for the sub-component(s) of the current componentized interface. In response to determining at decision point 546 to process a next sequence of sub-components (i.e., additional user interaction with the current sequence is completed or not detected), the process 500 returns to block 532 and selects the next sequence of one or more sub-components and iterates as described above.

As such, the process 500 creates a first componentized user interface that includes a first set of one or more user interface components that each represent an independent application sub-component indicated in the sequence of invocation. The process continues by creating, in response to user interaction with the first user interface component, one or more additional componentized user interfaces that also include one or more additional user interface components that also represent additional independent application sub-components indicated in the sequence of invocation. The process 500 further processes additional sequences of user interface components as selected and as customized by the user.

Returning to the description of decision point 544, in response to determining that processing for the componentized application is completed, the process 500 returns to the processing described in association with FIG. 5A at decision point 502, and iterates as described above.

Returning to the description of decision point 530 in FIG. 5A, in response to determining at decision point 530 that a sequence has not been specified for any of the sub-components within the text-list definition of the componentized application, the process 500 transitions to the processing shown and described in association with FIG. 5C.

FIG. 5C illustrates a second portion of additional processing associated with the process 500 for runtime selective sub-component invocation of customized ready-to-go componentized application definitions. At block 548, the process 500 prioritizes the created set of user interface components associated with the sub-component(s) within a single componentized graphical interface display component. As described above, the prioritization may include prioritizing a graphical user interface layout location of the respective different user interface component associated with each of the different listed independent application components of the text-list definition of the componentized application within the componentized user interface. As also described above, the prioritization may be based upon a position of an identifier of each of the different listed independent application sub-components of the text-list definition of the componentized application. At block 550, the process 500 displays the single componentized graphical interface display component comprising the organized created set of prioritized user interface components.

At decision point 552, the process 500 makes a determination as to whether user input has been detected in association with one or more of the sub-components represented within the displayed componentized graphical interface. It should be noted within this branch of processing that the process 500 may also detect a user selection of a user-selectable interactive record feature that allows a user to selectively capture and archive interactions performed using the ready-to-go application. These interactions may be captured as a context change associated with the respective sub-component, as described in more detail below.

In response to determining that user input has been detected in association with one or more of the sub-components, the process 500 accesses the respective sub-component(s) with the detected user input at block 554. As additionally described above, the access to the respective sub-component(s) with the detected user input may be local or remote access to the respective sub-components.

At decision point 556, the process 500 makes a determination as to whether the user input resulted in a context change for any of the respective sub-component(s). For example, the user may enter notes or information in association with use of any of the sub-components of the componentized application. This entered information may become new or updated context for the componentized application, and the information may be archived for later use within the same or a different componentized application. Additionally, the user may have selected the user-selectable interactive record feature that allows a user to selectively capture and archive interactions performed using the ready-to-go application. These interactions may be captured as a context change associated with the respective sub-component.

In response to determining that the user input resulted in a context change for one or more of the respective sub-components, the process 500 stores the changed context at block 558. The process 500 makes a determination as to whether processing for the componentized application is completed at decision point 560. The determination at decision point 560 that processing for the componentized application is completed may result, for example, from completion of processing of the last sub-component.

In response to determining at decision point 560 that processing for the componentized application is not completed, or in response to determining at decision point 556 that the user input did not result in a context change for any of the respective sub-component(s), the process 500 returns to decision point 552 to determine whether an additional user input has been detected in association with one or more of the sub-components and iterates as described above. Returning to the description of decision point 560, in response to determining that processing for the componentized application is completed, the process 500 returns to the processing described in association with FIG. 5A at decision point 502, and again iterates as described above.

As such, the process 500 provides for invocation of text-list definitions of componentized applications. Platform/device-specific individual and independent sub-components may be downloaded and configured for local usage, or remote access to server-based sub-components may be configured. Interface features for each sub-component are determined, and a set of user interface components is created to each represent one of the sub-components. Pre-configured context information may be provisioned to the respective sub-components, and a componentized user interface or sequence of componentized user interfaces may be presented that allow the user to individually interact with the discrete independent sub-components. Context changes may be stored so that user-entered information may be preserved for other uses.

As described above in association with FIG. 1 through FIG. 5C, the example systems and processes provide customized ready-to-go componentized application definitions. Many other variations and additional activities associated with customized ready-to-go componentized application definitions are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A system, comprising:
a memory; and
a processor programmed to:
receive a request to invoke a text-list definition of a componentized application stored within the memory, where the text-list definition of the componentized application identifies a collection of different listed independent application sub-components specified by a user to be executed as a set;
create a componentized user interface with a different user interface component associated with each of the different listed independent application sub-components within the text-list definition of the componentized application; and
independently access the different listed independent application sub-components based upon user inputs received in association with the respective different user interface component associated with each of the different listed independent application components within the text-list definition of the componentized application.

2. The system of claim 1, further comprising a display device, and where, in being programmed to create the componentized user interface with the different user interface component associated with each of the different listed independent application sub-components within the text-list definition of the componentized application, the processor is programmed to:
determine available sub-component interface features of each of the different listed independent application sub-components;
create a set of user interface components that each provides an interface to the determined available sub-component interface features of one of the different listed independent application sub-components;
organize the created set of user interface components within a componentized graphical interface display component; and
display, on the display device, the componentized graphical interface display component comprising the organized created set of user interface components.

3. The system of claim 1, where, in being programmed to create the componentized user interface with the different user interface component associated with each of the different listed independent application sub-components within the text-list definition of the componentized application, the processor is programmed to:
prioritize a graphical user interface layout location of the different user interface component associated with each of the different listed independent application sub-components within the text-list definition of the componentized application based upon a position of an identifier of each of the different listed independent application sub-components within the text-list definition of the componentized application.

4. The system of claim 1, where the text-list definition of the componentized application comprises an indication of a sequence of invocation of at least two of the different listed independent application sub-components, where a first independent application sub-component is specified to invoke a second independent application sub-component, and where: in being programmed to create the componentized user interface with the different user interface component associated with each of the different listed independent application sub-components within the text-list definition of the componentized application, the processor is programmed to:
create a first componentized user interface comprising a first user interface component associated with the first independent application sub-component indicated in the sequence of invocation specified to invoke the second independent application sub-component; and
create, in response to detecting completion of a user interaction with the first user interface component, a second componentized user interface comprising a second user interface component associated with the second independent application sub-component identified in the sequence of invocation.

5. The system of claim 1, where the processor is further programmed to define the text-list definition of the componentized application, comprising being programmed to:
provide a listing of available independent application sub-components to the user, where the available independent application sub-components are independently executable and provide distinct application features;
receive a user selection of a sub-set of the listed available independent application sub-components;
create the text-list definition of the componentized application comprising text identifiers of the selected sub-set of the listed available independent application sub-components; and
store the created text-list definition of the componentized application within the memory.

6. The system of claim 1, where the processor is further programmed to determine between downloading the different listed independent application sub-components for local execution and executing remote versions of the different listed independent application sub-components; and where:
in response to determining to download the listed different independent application sub-components for local execution, the processor is programmed to:
download a device-specific implementation of each of the different listed independent application sub-components specified by the user within the text-list definition of the componentized application;
store the downloaded device-specific implementation of each of the different listed independent application sub-components within the memory; and
where, in being programmed to independently access the different listed independent application sub-components based upon the user inputs received in association with the respective different user interface component associated with each of the different listed independent application components within the text-list definition of the componentized application, the processor is programmed to:
independently access the downloaded device-specific implementation of each of the different listed independent application sub-components within the memory; and
in response to determining to not download the different listed independent application sub-components for local execution, the processor is programmed to:
identify within at least one remote storage location within a distributed network each of the different listed independent application sub-components specified by the user within the text-list definition of the componentized application; and where, in being programmed to independently access the different listed independent application sub-components based upon the user inputs received in association with the respective different user interface component associated with each of the different listed independent application components within the text-list definition of the componentized application, the processor is programmed to:
  independently access the different listed independent application sub-components within the at least one remote storage location within the distributed network.

7. A computer program product, comprising:
  a non-transitory computer readable storage medium having computer readable program code embodied therewith, where the computer readable program code when executed on a computer causes the computer to:
    receive a request to invoke a text-list definition of a componentized application, where the text-list definition of the componentized application identifies a collection of different listed independent application sub-components specified by a user to be executed as a set;
    create a componentized user interface with a different user interface component associated with each of the different listed independent application sub-components within the text-list definition of the componentized application; and
    independently access the different listed independent application sub-components based upon user inputs received in association with the respective different user interface component associated with each of the different listed independent application components within the text-list definition of the componentized application.

8. The computer program product of claim 7, where, in causing the computer to create the componentized user interface with the different user interface component associated with each of the different listed independent application sub-components within the text-list definition of the componentized application, the computer readable program code when executed on the computer causes the computer to:
  determine available sub-component interface features of each of the different listed independent application sub-components;
  create a set of user interface components that each provides an interface to the determined available sub-component interface features of one of the different listed independent application sub-components;
  organize the created set of user interface components within a componentized graphical interface display component; and
  display the componentized graphical interface display component comprising the organized created set of user interface components.

9. The computer program product of claim 7, where, in causing the computer to create the componentized user interface with the different user interface component associated with each of the different listed independent application sub-components within the text-list definition of the componentized application, the computer readable program code when executed on the computer causes the computer to:
  prioritize a graphical user interface layout location of the different user interface component associated with each of the different listed independent application sub-components within the text-list definition of the componentized application based upon a position of an identifier of each of the different listed independent application sub-components within the text-list definition of the componentized application.

10. The computer program product of claim 7, where the text-list definition of the componentized application comprises an indication of a sequence of invocation of at least two of the different listed independent application sub-components, where a first independent application sub-component is specified to invoke a second independent application sub-component, and where:
  in causing the computer to create the componentized user interface with the different user interface component associated with each of the different listed independent application sub-components within the text-list definition of the componentized application, the computer readable program code when executed on the computer causes the computer to:
    create a first componentized user interface comprising a first user interface component associated with the first independent application sub-component indicated in the sequence of invocation specified to invoke the second independent application sub-component; and
    create, in response to detecting completion of a user interaction with the first user interface component, a second componentized user interface comprising a second user interface component associated with the second independent application sub-component identified in the sequence of invocation.

11. The computer program product of claim 7, where the computer readable program code when executed on the computer further causes the computer to define the text-list definition of the componentized application, comprising causing the computer to:
  provide a listing of available independent application sub-components to the user, where the available independent application sub-components are independently executable and provide distinct application features;
  receive a user selection of a sub-set of the listed available independent application sub-components;
  create the text-list definition of the componentized application comprising text identifiers of the selected sub-set of the listed available independent application sub-components; and
  store the created text-list definition of the componentized application.

12. The computer program product of claim 7, where the computer readable program code when executed on the computer further causes the computer to:
  download a device-specific implementation of each of the different listed independent application sub-components specified by the user within the text-list definition of the componentized application; and
  store the downloaded device-specific implementation of each of the different listed independent application sub-components within a local storage; and
  where, in causing the computer to independently access the different listed independent application sub-components based upon the user inputs received in association with the respective different user interface component associated with each of the different listed independent application components within the text-list definition of the componentized application, the computer readable program code when executed on the computer causes the computer to:

independently access the downloaded device-specific implementation of each of the different listed independent application sub-components within the local storage.

13. The computer program product of claim 7, where the computer readable program code when executed on the computer further causes the computer to:

identify within at least one remote storage location within a distributed network each of the different listed independent application sub-components specified by the user within the text-list definition of the componentized application; and where, in causing the computer to independently access the different listed independent application sub-components based upon the user inputs received in association with the respective different user interface component associated with each of the different listed independent application components within the text-list definition of the componentized application, the computer readable program code when executed on the computer causes the computer to:

independently access the different listed independent application sub-components within the at least one remote storage location within the distributed network.

* * * * *